April 5, 1927.
C. F. KING
DOUBLE ACTING TRAP
Filed June 22, 1926
1,623,841
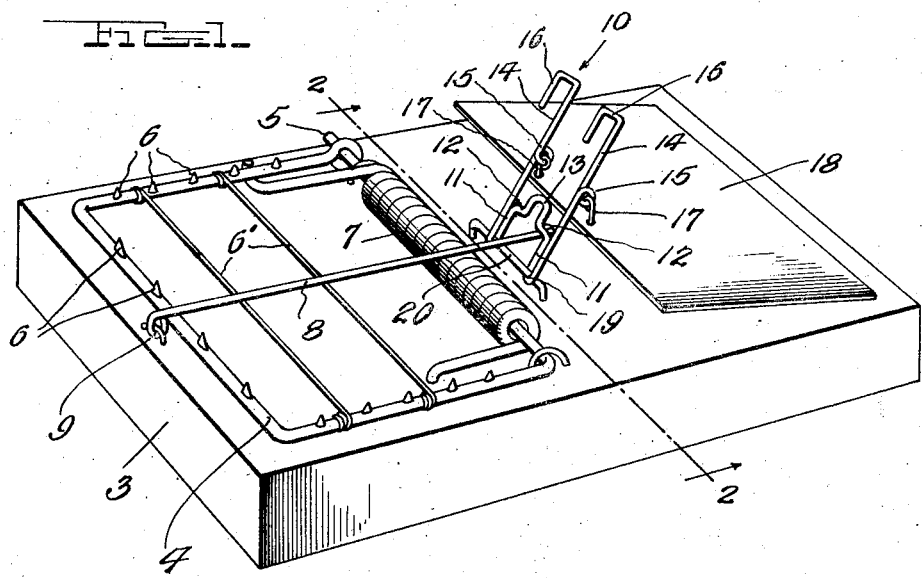
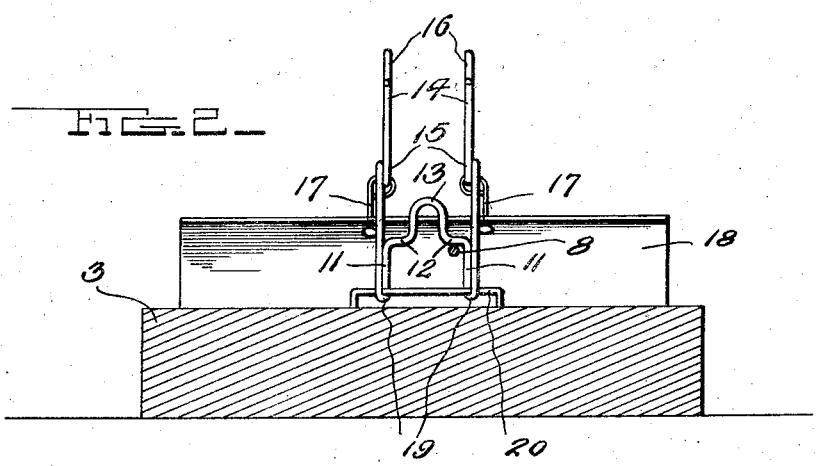
INVENTOR.
C. F. King
BY
James J. Sheehy ATTORNEYS.

Patented Apr. 5, 1927.

1,623,841

UNITED STATES PATENT OFFICE.

CLIFFORD F. KING, OF NEW ORLEANS, LOUISIANA.

DOUBLE-ACTING TRAP.

Application filed June 22, 1926. Serial No. 117,710.

My present invention pertains to rat and mouse traps and it contemplates the provision of a simple and inexpensive as well as easily set up and operated trap that is not only adapted to catch the rodent that has arrived at the point where it will nibble the bait but it is further adapted to trap the rodent regardless of whether it reaches the bait or not.

It is a well known fact that with the trap in general use operation of the jaw or catching elements is contingent upon the rodent touching or otherwise disturbing the bait but in this device the mere act of approaching the bait is sufficient to warrant operation of the jaw and it will be seen by further consideration of the specification that the trap is a double acting one.

The invention in all of its details will be fully understood from the following description and claims when the same is read in connection with the drawings accompanying and forming part of this specification, in which—

Figure 1 is a perspective view showing my novel trap set up ready for operation.

Figure 2 is a view taken in the plane indicated by the line 2—2 in Figure 1 and looking in the direction of the arrow.

Similar numerals of reference designate corresponding parts in both views of the drawings.

My novel trap comprises the base 3 that may be a block of wood or other suitable support and mounted on the base is a bail or swinging jaw 4 having the end portion 5 and spaced throughout the bail are prongs 6 while extending from one side of the bail to the opposite side thereof are rods 6' and the said bail is placed under tension by means of the spring 7. Adapted to hold the bail under tension of the spring and prevent operation of the bail when desired is a rod 8 fast at its forward end on the block 3 and secured by the loop 9. The trigger of my novel trap bears at one end against the free end of the rod 8 and is indicated as a whole by 10 and it comprises the bail shank portion 11 having the reduced portions 12 and the extreme loop 13. The said bail shank 11 has the extensions 14 and the eyes 15 formed in the extensions and on their extreme ends the extensions are provided with the bait receiving members 16.

Secured in the eyes 15 are fasteners 17 and the said fasteners are in turn secured permanently to a spring plate 18 that has one end thereof slidably mounted on the base 3 and the opposite end extending upwardly toward the bail shank 11.

The fasteners 17 are pivotally secured in the eyes 15 and arranged immediately behind the spring 7 on the base 3 is a pivot rod 20 around which is looped the portions 19 of the bail shank 11.

In the practical operation of the invention, bait is placed on the portions 16 of the extensions 14 and the bail 4 is placed under tension and bearing flat upon the base 3. The bail 11 is positioned so that the same will assume the position shown in Figure 1 and hold through the medium of fasteners 17 the platform at the incline illustrated. The free end of the rod 8 will rest under one of the reduced portions 12 of the bail shank 11. The trap is now set ready for operation. If a rodent places itself upon the platform 18, said platform will move downwardly and pull the fasteners 17 so that the bail shank will assume practically an upright position and a position other than the angular position illustrated in Figure 1. This will cause the free end of the rod 8 to travel upwardly and thereby release the tension on the bail 4 and in this manner the rodent will be trapped. However if for any reason the weight of the rodent would not operate the trap the act of nibbling the bait would move the bail shank sufficiently to actuate the rod 8 and the bail 4 for the purpose before described.

It will be manifest that the platform 18 will pull the fasteners 17 downwardly regardless of how slight the pressure on said platform may be.

What I claim is:

1. A trap comprising a base, a bail mounted on the base, means for placing the bail under tension, a rod adapted to straddle the bail, a bail shank arranged adjacent the bail and further engaging a portion of the rod, a second rod secured to the base for pivotally holding the bail shank above said base; the bail shank having reduced portions, eyes formed in the bail shank and bait holding means arranged thereon, fastening means mounted in the eyes and a plate secured to the fastening means and mounted on the base.

2. A trap comprising a base, a barbed bail mounted on the base, a spring for placing the bail under tension, a rod secured to the base and adapted to straddle the bail, a bail shank, arranged adjacent the spring, and adapted to engage a portion of the rod, a small rod secured to the base for pivotally holding the bail shank above the base; said bail shank having reduced portions and extensions that are provided with eyes and terminate in bait holding ends, fasteners arranged in the eyes and a spring plate secured at one end to the fasteners and bearing at its other end on the base.

3. A trap comprising a support, a barbed bail pivotally mounted thereon and adapted to be placed under tension, a bail shank adjacent the bail and having fasteners and further having bait holding means and reduced portions, a rod secured to the support and having a free end adapted to engage the reduced portions of the bail shank and a platform mounted on the support and having one end thereof engaging the fasteners.

In testimony whereof I have hereunto set my hand.

CLIFFORD F. KING.